UNITED STATES PATENT OFFICE.

JOHN STEWART MacARTHUR, OF POLLOKSHIELDS, COUNTY OF RENFREW, AND ROBERT WARDROP FORREST AND WILLIAM FORREST, OF GLASGOW, COUNTY OF LANARK, ASSIGNORS TO THE CASSEL GOLD EXTRACTING COMPANY, (LIMITED,) OF GLASGOW, SCOTLAND.

PROCESS OF SEPARATING GOLD AND SILVER FROM ORE.

SPECIFICATION forming part of Letters Patent No. 418,137, dated December 24, 1889.

Application filed April 4, 1889. Serial No. 305,998. (Specimens.) Patented in Natal September 11, 1888, No. 32; in New South Wales September 27, 1888, No. 965, and in Tasmania September 29, 1888, No. 609.

*To all whom it may concern:*

Be it known that we, JOHN STEWART MACARTHUR, residing at Pollokshields, in the county of Renfrew, and ROBERT WARDROP FORREST and WILLIAM FORREST, both residing at Glasgow, in the county of Lanark, Scotland, all subjects of the Queen of Great Britain, have invented certain new and useful Improvements in the Process of Separating Gold and Silver from Ores, (for which we have received Letters Patent in Natal, No. 32, dated September 11, 1888; New South Wales, No. 965, dated September 27, 1888, and Tasmania, No. 609, dated September 29, 1888;) and we do hereby declare that the following is a full, clear, and exact description of the invention, which will enable others skilled in the art to which it appertains to make and use the same.

This invention relates to an improvement in the process of separating precious metals from ores described in Letters Patent of the United States, No. 403,202, granted to us May 14, 1889. In that process a cyanide is used as the separating agent, and it has been found that ores containing pyrites or sulphurets which have been exposed to the weather and become partially oxidized absorb a comparatively large quantity of the cyanide.

The object of this invention is to economize the process by preventing the absorption of the cyanide.

The invention consists in separating precious metals from ores by first neutralizing the ore by the addition of an alkali or alkaline earth and then leaching such prepared charge with a cyanide solution.

In carrying out the first or preparatory step of this improved process, we take ore containing iron pyrites or other compound which has become partially oxidized by exposure to the weather and mix with it, when in a powdered state, a sufficient quantity of potash, lime, or other alkali or alkaline earth, to neutralize the salts of iron or other objectionable ingredients formed by the partial oxidation.

The quantity of alkali or alkaline earth to be employed will depend upon the nature of the ore, and must be determined by first taking a test quantity of the particular ore to be treated and adding the alkali or alkaline earth thereto until the alkali ceases to be absorbed. When this condition is reached, the liquid will cause red litmus paper to turn blue. The proportion of the alkali or alkaline earth so absorbed will indicate the proper proportion thereof to be added to the bulk of the ore to be treated. In case lime is employed, one per cent. of the alkali to ninety-nine per cent. of ore will generally be found sufficient. After this preparatory treatment, the ore (which may consist of tailings or residues from other processes or operations) is treated with the cyanide solution by being agitated therewith or by being ground therewith in a pan-mill or other suitable grinding-mill; or, as we find preferable in the case of some ores, the cyanide solution may be made to percolate through said ores one or more times until all or nearly all the precious metals are dissolved. For this percolation very simple tanks, vats, or vessels may be used, such vessels being provided with permeable false bottoms or any suitable filtering apparatus. The cyanide solution containing the gold or silver is next made to pass through a sponge of zinc, whereby said metal is precipitated from the solution and retained in the sponge. The zinc sponge is preferably composed of fine threads or filaments of zinc. These zinc threads are formed in shavings cut by a turning-tool from a series of zinc disks held in a lathe; or the sponge may be formed by passing molten zinc at a temperature just above the melting-point through a fine sieve and allowing it to fall into the water. The sponge thus formed presents a very large contact-surface for the solution, and it does not become easily choked.

The precious metals may be separated from the zinc sponge by distillation; or the zinc sponge containing the precious metal may be placed in a suitable sieve and subjected to a screening operation, preferably under water. In this operation the greater part of the precious metal will pass through the sieve and the greater part of the zinc sponge will remain therein.

We claim as our invention—

1. The process of separating precious metal from an ore, which consists in neutralizing the ore by the addition of an alkali or alkaline earth, and then leaching the neutralized ore with a cyanide solution.

2. The process of separating precious metal from an ore, which consists in neutralizing the ore by the addition of an alkali or alkaline earth, then leaching the neutralized ore with a cyanide solution, and then passing the cyanide solution containing the precious metal through a sponge of zinc, substantially as set forth.

JOHN STEWART MacARTHUR.
ROBERT WARDROP FORREST.
WILLIAM FORREST.

Witnesses:
ROBERT JAMIESON MACKINLAY,
CHARLES KEITH RITCHIE,
*Both of 160 West George Street, Glasgow, Clerks at Law.*